(12) United States Patent
Herve

(10) Patent No.: US 6,319,873 B1
(45) Date of Patent: Nov. 20, 2001

(54) BIOLOGICAL ACTIVATOR FOR A SEPTIC TANK

(75) Inventor: Philip Herve, Montpellier (FR)

(73) Assignee: Eparco, Paris (FR)

(*) Notice: Subject to any disclaimer, the term of this patent is extended or adjusted under 35 U.S.C. 154(b) by 0 days.

(21) Appl. No.: 07/985,354

(22) Filed: Dec. 1, 1992

Related U.S. Application Data

(63) Continuation of application No. 07/492,713, filed on Mar. 13, 1990, now abandoned, which is a continuation-in-part of application No. 07/055,189, filed on May 28, 1987, now abandoned.

(30) Foreign Application Priority Data

May 30, 1986 (FR) .................................................. 86 07805

(51) Int. Cl.$^7$ ........................................................ B01J 29/06
(52) U.S. Cl. .......................... 502/67; 516/79; 210/616; 514/770
(58) Field of Search .................... 252/313.1; 210/616; 502/67; 501/27; 514/770

(56) References Cited

U.S. PATENT DOCUMENTS

| | | | |
|---|---|---|---|
| 2,795,542 | * 6/1957 | Horne et al. ........................... | 210/17 |
| 2,905,643 | * 9/1959 | Billue ................................... | 252/313 |
| 3,968,036 | * 7/1976 | Liles et al. ........................... | 210/616 |
| 4,200,524 | * 4/1980 | Levin ................................... | 210/616 |
| 4,213,871 | * 7/1980 | Bavaveas .............................. | 252/60 |
| 4,626,354 | * 12/1986 | Hoffman et al. ................. | 210/616 X |
| 4,680,277 | * 7/1987 | Horiuchi .............................. | 501/27 |

FOREIGN PATENT DOCUMENTS

| | | | |
|---|---|---|---|
| 2 357 490 | * 2/1978 | (FR) . | |
| WO 82/03386 | * 10/1982 | (WO) .................................... | 501/27 |

* cited by examiner

*Primary Examiner*—Gary Geist
(74) *Attorney, Agent, or Firm*—Young & Thompson

(57) ABSTRACT

This invention relates to a biological activator for a septic tank of the type comprising a product in the form of solid particles, which is non-corrosive, non-toxic, finely divided, and of large specific area, comprising a colloidal phase in suspension and a flocculent phase, having a reducing power of mineral origin, its function being to form a support for anaerobic microbial flora in a septic tank in order to increase the bacterial saturation density in a septic tank for an equivalent quantity of nutrients, its specific area being (in m$^2$/g) between about 25 and 66, more particularly between about 35 and 66, and advantageously between about 46 and 60, and a cation exchange capacity (in meq/100 g) between about 9 and 38, more particularly between about 14 and 38, and advantageously between about 24 and 35.

21 Claims, No Drawings

BIOLOGICAL ACTIVATOR FOR A SEPTIC TANK

This application is a continuation of application Ser. No. 07/492.713, filed Mar. 13, 1990, which in turn is a continuation-in-part of application Ser. No. 07/055,189, filed May 28, 1987 now abandoned.

FIELD OF THE INVENTION

This invention relates to an improved biological activator for a septic tank.

BACKGROUND OF THE INVENTION

French Patent 2,357,490 discloses a biological septic tank activator, in the form of a non-corrosive, non-toxic finely divided product of large specific area, which forms a support for the optional anaerobic microbial flora. The activator enables the bacterial saturation density in the septic tank to be increased for an equivalent quantity of nutrients and comprises: firstly a colloidal phase in suspension and, secondly, a flocculent phase. The patent discloses that the specific area of the biological activator is less than 1 $m^2/g$. Also, the cation exchange capacity of a known biological activator of this kind may be put at about 9 meq/100 g.

Kaolinite particles are used per se as biological activators. However, use of kaolinic clays as the principal basic component of prior biological activators limits the values of the useful parameters for the biological activation function for a septic tank because of the actual physico-chemical characteristics of such clays. It is particularly the specific area and cationic exchange capacity which are limited depending upon the actual composition of the kaolinic clays. The specific area and cationic exchange capacity are important parameters in a biological activator. Inasmuch as these two parameters determine the ion exchanges, the absorption of organic substrates, and the fixation of bacteria and enzymes, the values for these parameters should be as high as possible in order to provide optimum biological activation of a septic tank.

A mixture of natural zeolites has been produced and sold under the trademark ZEOPORT B180. This product is known to have high porosity, high exchange capacity and the ability to absorb certain gaseous molecules. However, because this product has a high pH and brings oxygen which is detrimental for anaerobic bacteria, it has no, and in fact can have no, activation effect for use in a septic tank.

OBJECTS OF THE INVENTION

An object of the invention, therefore, is to provide a biological activator which exceeds the limits of prior biological activators.

This object is achieved by the biological activator according to the invention which has, on one hand, a large specific area (in $m^2/g$) between about 25 and 66, more particularly between about 35 and 66, and advantageously between about 46 and 60 and, on the other, a cation exchange capacity (in meq/100 g) between about 9 and 38, more particularly between about 14 and 38, and advantageously between about 24 and 35.

Consequently, the improved biological activator according to the invention has a specific area on the order of 30 or more times greater than that of the prior biological activator. The cation exchange capacity of the improved biological activator according to the invention is about 2 to 3 times that of the prior biological activator.

The improvements of the specific area and cation exchange capacity in accordance with the invention are obtained without any appreciable deterioration of the other important parameters of the prior biological activator. This applies particularly to the redox potential and the colloidal phase—flocculent phase structure.

This and other objects, features and advantages of the invention will become readily apparent from the following description, and the novel features will be particularly pointed out in the appended claims.

SUMMARY OF THE INVENTION

The invention broadly relates to a biological activator for a septic tank of the type comprising a product in the form of solid particles, which is non-corrosive, non-toxic, finely divided, and of large specific area, comprising in solution essentially a colloidal phase in suspension and a flocculent phase, having in solution a reducing power of mineral origin. The biological activator functions to form a support for the anaerobic microbial flora of a septic tank in order to increase the bacterial saturation density in the septic tank for an equivalent quantity of nutrients.

Thus, the invention is directed to such a biological activator for a septic tank which comprises in admixture particles of a kaolinite and particles of an essentially vitreous material. In an embodiment of the invention, the biological activator comprises in admixture about 70–95% (all percentages for constituents of the biological activator are by weight), advantageously about 80–95%, more advantageously about 80–90%, of particles of a kaolinite and about 5–30%, advantageously about 10–20%, more advantageously about 10–15% of particles of an essentially vitreous material. In one embodiment, the essentially vitreous material comprises microporous particles of at least one zeolite. Advantageously, the zeolite is a natural zeolite, e.g., chabazite or phillipsite. The microporous particles can also comprise a mixture of naturally occurring zeolites, e.g., a mixture of chabazite and phillipsite. In such a mixture, the chabazite and phillipsite are present in equal amounts.

Inasmuch as a mixture of natural zeolites is not known to be suitable, by itself, for use in biological activators nor is it in fact used by itself in biological activators, it has been discovered surprisingly that the addition of particles of an essentially vitreous material, in particular microporous particles of at least one zeolite, to kaolinite particles yields a biological activator with properties, as described herein, which are superior to the properties of prior biological activators.

DETAILED DESCRIPTION OF THE INVENTION

According to the invention, the biological activator has a specific area (in $m^2/g$) of between about 25 and 66, more particularly between about 35 and 66, and advantageously between about 46 and 60.

According to another feature, the biological activator according to the invention has a cation exchange capacity (in meq/100 g) of between about 9 and 38, more particularly between about 14 and 38, and advantageously between about 24 and 35.

The above-mentioned specific area is obtained with a biological activator in which at least about 80% of the particles have a grain size less than approximately 16 microns, and at least about 50%–60%, advantageously about 61% of the particles have a grain size less than approximately 4 microns.

Since the improved biological activator according to the invention may in part comprise an essentially vitreous material in particle form of a grain size which can be adjusted according to the degree of grinding and screening used, it is possible to adjust the specific area of the biological activator within a certain range while the specific area of the other constituent of the improved biological activator—mainly a kaolinite—can remain unadjusted. However, the specific area depends not only on the grain size of the particles forming the biological activator but also on the internal and open microporosity of the particles.

The improved biological activator according to the invention has an apparent density in air of between about 0.95 and 1.17 and more particularly equal or close to 1.06.

The density in water—which differs from the real density because of air trapped in the internal micropores—is between about 2 and 2.75, more particularly between about 2.25 and 2.75, and advantageously equal or close to 2.6.

The improved biological activator for a septic tank according to the invention has a bulk (i.e., a volume decanted in water per unit weight) of between about 1.5 and 2.6, more particularly between about 2 and 2.6 and in particular equal or close to 2.33. Also, its inflation ratio, i.e., the increase in total volume of a mass of particles of the product between about the dry medium and the aqueous medium after decantation expressed as a percentage is between about 0 and 65, more particularly between about 53 and 65 and in particular equal or close to 59.

The pH of the biological activator according to the invention, i.e., the pH of a mixture of 20 g of the biological activator in powder form and in suspension in 50 ml of boiled distilled water after two minutes of agitation and two hours of rest is between about 6.8 and 7.9, more particularly, between about 7.2 and 7.9, advantageously equal or close to 7.85.

The negative redox potential of the biological activator according to the invention is close to that of the sludges of a septic tank. In particular, this redox potential for 20 g of biological activator in powder form in 50 ml of oxygen-saturated distilled water at 20° C. is about −500 mV or less, advantageously less than about −350 mV.

The proportion of volatile materials (expressed as a percentage of the dry weight of the biological activator according to the invention) is between about 6.5 and 9.5, more particularly between about 7.2 and 9.2, advantageously between about 7.3 and 9.1, and more advantageously between about 8.2 and 9.0.

The biological activator according to the invention comprises essentially macro elements in the form of silica as $SiO_2$, aluminum as $Al_2O_3$, iron as $Fe_2O_3$ and calcium as CaO. More particularly, the biological activator according to the invention contains between about 43% and 94%, more particularly between about 83% and 91%, advantageously between about 44% and 89%, in particular between about 48% and 81% of silica; between about 3% and 30%, more particularly between about 5% and 27%, of aluminum; between about 1.8% and 7.7%, more particularly between about 2.3% and 6.5%, advantageously between about 2.7% and 6%, and in particular between about 3% and 6% of iron; and between about 1.3% and 5.9%, more particularly between about 1.8% and 4.6%, advantageously between about 2.2% and 4.2% and in particular between about 2.4% and 3.8% of calcium.

The biological activator according to the invention can further comprise on the order of about 1 to 2% MgO and $Na_2O$ each, on the order of less than about 6% of $TiO_2$ and on the order of less than about 1% $K_2O$ and $P_2O_5$ each.

The biological activator according to the invention also contains trace elements whose order of magnitudes of the contents in mg/kg are as follows: manganese between about 168 and 724, more particularly between about 240 and 465, advantageously between about 300 and 380, and in particular equal or close to 344; cobalt between about 169 and 277, more particularly between about 173 and 216, advantageously between about 175 and 214, and in particular equal or close to 194; zinc between about 601 and 5000, more particularly between about 713 and 964, advantageously between about 750 and 918 and in particular equal or close to 834; copper between about 1641 and 2976, more particularly between about 2038 and 2815, advantageously between about 2170 and 2653 and in particular equal or close to 2412; beryllium between about 37.8 and 69.4, more particularly between about 47.2 and 65.5, advantageously between about 50.4 and 61.7 and-in particular equal or close to 56.04; and titanium between about 13068 and 16368, more particularly between about 13200 and 16302, advantageously between about 13284 and 16236, and in particular equal or close to 14760.

More particularly, the improved biological activator according to the invention comprises between about 70% and 90%, advantageously about 80–95% and more advantageously about 80–90% of particles of kaolinite and about 5 to 30%, advantageously about 5 to 20%, more advantageously about 10–15%, of vitreous material.

In a preferred embodiment of the invention, the kaolinite particle component of the biological activator has a specific area between about 29 and 35 $m_2/g$, a cation exchange capacity between about 12 and 16 meq/100 g, at least 91% of the kaolinite particles having a grain size less than about 16 microns, a density in water between about 2.4 and 3, a pH between about 6.8 and 7.3 and a negative redox potential of about 400 to 600 mV, and includes about 2% of $Fe_2O_3$, about 2,000 mg/kg of Cu and about 4500 mg/kg of Zn. Advantageously, the kaolinite particle component further includes about 7.8% of volatile materials, between about 56.6 and 60.5% of $SiO_2$, between about about 23 and 24.6% of $Al_2O_3$ and about 5.5% of $TiO_2$.

In another preferred embodiment, the microporous zeolite particle component of the biological activator has a specific area of about 250 $m_2/g$, a cation exchange capacity of about 170 meq/100 g, at least about 95% of the zeolite particles have a grain size less than about 180 microns, a density in water of about 2.2, a pH of about 8.87 and a positive redox potential and includes about 46.5% of $SiO_2$, of about 15% of $Al_2O_3$ and about 10% of CaO. The microporous zeolite particle component can further include about 15% of volatile materials, about 2.3% of MgO and 3% of $Fe_2O_3$. Advantageously, the zeolite is a natural zeolite, e.g., chabazite or phillipsite. More advantageously, the zeolite component is a mixture of two natural zeolites, e.g., chabazite and phillipsite, wherein the mixture contains equal amounts of the natural zeolites.

In a very advantageous embodiment of the invention, the biological activator comprises in admixture about 87.5% of kaolinite particles and about 12.5% of zeolite particles and has a specific area of about 59.3 $m^2/g$, a cation exchange capacity of about 33.5 meq/100 g, at least about 61% of the particles are less than about 4 microns and at least about 80% are less than about 16 microns, a density in water of about 2.6, a pH of about 7.85, a negative redox potential less than about 350 mV, and also includes about 8.7% of volatile materials, about 57% of $SiO_2$, about 22.7% of $Al_2O_3$, about 2.1% of $Fe_2O_3$, about 1.5% of CaO, about 0.4% of MgO, about 0.22% of $Na_2O$, about 4.9% of $TiO_2$, about 0.8% of $K_2O_5$, about 0.1% of $P_2O_5$, about 2,000 mg/kg of Cu and about 4,500 mg/kg of Zn.

The invention will be more fully described and understood with reference to the following examples which are given by way of illustration.

A prior biological activator (i.e., EPARCYL®, hereinafter referred to as "(a)") and a biological activator in accordance with the invention ((i.e., a combination of EPARCYL® and ZEOPORT B180® (a 50/50 mixture of the natural zeolites chabazite and phillipsite), hereinafter referred to "(a) +(b)")) were tested to assess acetate methanization and to assess the volume of cellulose. The tests were carried out in accordance with a general procedure developed and widely used by those skilled in the art in order to reproduce as closely as possible the workings of a septic tank. The procedure used was the following:

Several bottles (or equivalent), each with a volume of 120 ml, were prepared to contain each of the following components:

50 ml of a medium allowing for the growth of anaerobic bacteria. Such medium includes mineral elements, oligoelements and vitamins;

1 ml of a reductor solution;

0.5 ml of sludge from a septic tank; and a fixed quantity of a carbonated substrate such as acetate or cellulose.

The bottles were hermetically sealed in an atmosphere of 85% nitrogen and 15% $CO_2$ and thereafter were incubated at 20±1° C. All the bottles were then monitored over time in parallel with an equal number of reference bottles not containing any biological activator. A test bottle and a reference bottle were sacrificed for each measurement.

Three series of bottles were prepared:

(i) bottles containing (a);

(ii) bottles containing (a)+(b), with the proportion of 90% for (a) and 10% for (b) (in both cases, the activator (a) or (a+b) was used in the amount of 4 mg/l in the first test and 3 mg/l in the second test); and (iii) reference bottles without any biological activator.

In the first test, acetate methanization was determined by assessing:

(i) the chemical oxygen demand (COD); and (ii) the production of methane.

In this first test, acetate was used as the substrate in an amount of 2 g/l.

Firstly, the time (in days) necessary to have a COD less than 500 mg $O_2/l$ was measured. This time is referred to as "the end of the reactions". The end of the reactions for each of the biological activators was measured as:

| For (a) | 70 days. |
|---|---|
| For (a) + (b) | 53 days. |

Secondly, the time (in days) necessary for the beginning of the biological process was measured. This is referred to as the "latency time". The latency times for each of the biological activators was measured as:

| For (a) | less than 35 days. |
|---|---|
| For (a) + (b) | less than 35 days. |
| For the reference | between about 59 and 70 days. |

A biological activator for a septic tank has in general two effects: the decrease of the "latency time" and the increase of the speed of the reaction. (b) by itself has a latency time which is longer than (a) alone which explains why (b) alone is not suitable as a biological activator for a septic tank. However, the speed of reaction is increased by adding (b) to (a). When (b) in the proportion of about 10% is combined with (a), (b) does not change the "latency time" of (a)+(b) but has the surprising effect of reducing substantially the duration of the reaction. The results of this test are summarized in Table 1.

TABLE 1

| | Production of $CH_4$ ml/l · day | COD mg $O_2/l$ · day |
|---|---|---|
| (a) | 19.5 | −47.5 |
| (a) + (b) | 38.8 | −105.6 |
| Reference | 0 | −10.6 |
| (b) alone | 0 | −10.3 |

The data in Table 1 show that the combination (a)+(b) (in the proportion of about 90% for (a) and 10% for (b)) gives results which are on the whole double those of (a) alone. Furthermore, the results obtained with (b) alone would not lead one to combine (b) with (a) and expect the surprising results obtained with (a)+(b).

Next, the volume of cellulose was tested. For this test, pure cellulose (filter paper) was used as the substrate in an amount of 4 g/l. During the test, the paper exfoliates due to anaerobic digestion to yield a fluffy mass. The volume of this mass is important because exfoliation occurs in a septic tank. Thereafter, the paper is rendered soluble yielding volatile fatty acids which are themselves methanized. The relevant parameter is the volume of cellulose before the solubilization because in a septic tank the cellulose fibers coming from the exfoliated paper determine the volume of the sludge. The volumes (in ml/l) were measured after 40 and 60 days, respectively. The results are summarized in Table 2.

TABLE 2

| | 40 days | 60 days |
|---|---|---|
| (a) | 194 | 175 |
| (a) + (b) | 139 | 104 |
| Reference | 320 | 304 |

The data of Table indicate that the addition of (b) to (a) allows about a 40% to 60% reduction in volume.

Comparative activation tests using a control and a biological activator according to the invention were carried out and gave the data shown in Tables 3 and 4. Table 3 shows the chemical oxygen demand and gas production after 11 days' incubation in an inoculated medium whose substrate was sodium acetate, the biological activator according to the invention being used in a proportion of 4 g/l. Table 4 shows the cumulative gas production against time, the tests being carried out at 20° C. in septic tank sludges, the activator having been added in the proportion of 500 mg/l.

TABLE 3

|  | Control | Activator according to the invention | Variation |
|---|---|---|---|
| Chemical oxygen demand (mg $O_2$/l) | 1633 | 264 | −618% |
| Gas production (ml/l) | 183 | 607 | +332% |

TABLE 4

| | Cumulative gas production ml/l | | |
|---|---|---|---|
| Digestion time in number of days | Control | Activator according to the invention | Variation |
| 146 | 932 | 1224 | +31% |
| 175 | 1792 | 2190 | +22% |
| 210 | 2732 | 3400 | +24% |

The data of Tables 3 and 4 show the very positive biological activation effect obtained with a biological activator according to the invention as evidenced by a substantial increase in the gas production as compared with, e.g., the prior biological activator of French Patent 2,357,490.

Other embodiments of the invention will be apparent to those skilled in the art from a consideration of this specification or practice of the invention described herein.

I claim:

1. A biological activator for a septic tank which activator comprises particles of essentially vitreous materials and kaolinite.

2. The biological activator according to claim 1 wherein the vitreous materials comprise particles of at least one zeolite.

3. The biological activator according to claim 2 which comprises in admixture:
    between about 80 and 95% of particles of kaolinite and between about 5 and 20% of particles at least one zeolite, and wherein the kaolinite particles have:
    (i) a specific area of between about 29 and 66 $m^2$/g;
    (ii) a cation exchange capacity of between about 12 and 38 meq/100 g;
    (iii) a grain size of less than about 16 microns for at least about 91% of the particles;
    (iv) a density in water of between about 2.25 and 3 Kg/$m^3$;
    (v) a negative redox potential of about 350 to 600 mV;
    (vi) a pH of between about 6.8 and 7.3; and wherein the particles are comprised of about 2% of $Fe_2O_3$, about 2,000 mg/kg of Cu, and about 4,500 mg/kg of Zn.

4. The biological activator according to claim 2 which comprises in admixture:
    between about 80 and 95% of particles of kaolinite and between about 5 and 20% of particles of at least one zeolite, and wherein the zeolite particles have:
    (i) a specific area of about 250 $m^2$/g;
    (ii) a cation exchange capacity of about 170 meq/100 g;
    (iii) a grain size less than about 180 microns for at least about 95% of the particles;
    (iv) a density in water of about 180 kg/$m^3$;
    (v) a pH about 8.87;
    (vi) a positive redox potential;
and wherein the particles are comprised of about 46.5% of $SiO_2$, about 15% of $Al_2O_3$, and about 10% of CaO.

5. The biological activator according to claim 3 wherein the kaolinite particles further have:
    (i) a specific area of between about 35 and 66 $m^2$/g;
    (ii) a cation exchange capacity of between about 14 and 38 meq/100 g;
    (iii) a grain size of less than about 16 microns for at least about 20% of the particles;
    (iv) a density in water of between about 2.25 and 2.75 kg/$m^3$;
    (v) a pH of between about 7.2 and 7.9; and
    (vi) a negative redox potential of less than about −500 mV.

6. The biological activator according to claim 1 further having a volume displaced in water per unit weight of between 2.0 and 2.6 $dm^3$/kg.

7. The biological activator according to claim 1, further having an inflation ratio of between about 53 and 65%.

8. The biological activator according to claim 1, further having a proportion of volatile materials of between about 7.2 and 9.2%.

9. The biological activator according to claim 1, further comprising between about 43 and 81% of silica in the form of $SiO_2$.

10. The activator according to claim 1, further comprising between about 5 and 27% of aluminum in the form of $Al_2O_3$.

11. The biological activator according to claim 1, further comprising between about 1.8 and 7.7% of iron in the form of $Fe_2O_3$.

12. The biological activator according to claim 1, further comprising between about 1.3 and 5.9% of calcium in the form of CaO.

13. The biological activator according to claim 1, further comprising trace elements, which trace elements are present in the amounts of between about 168 and 724 mg/kg manganese, about 169 and 217 mg/kg cobalt, about 601 and 5000 mg/kg zinc, about 1641 and 2976 mg/kg copper, about 37.8 and 69.4 mg/kg beryllium and about 13068 and 16368 mg/kg titanium.

14. A biological activator for a septic tank which activator comprises in admixture about 87.5% particles of kaolinite and about 12.5% particles of at least one zeolite, and
    wherein the kaolinite particles have:
    (i) a specific area of between about 29 and 35 $m^2$/g;
    (ii) a cation exchange capacity of between about 12 and 16 meq/100 g;
    (iii) a grain size of less than about 16 microns for at least about 91% of the particles;
    (iv) a density in water of between about 2.4 and 3 kg/$m^3$;
    (v) a negative redox potential of about 400 to 600 mV;
    (vi) a pH of between about 6.8 and 7.3; and which kaolinite particles further comprise about 2% of $Fe_2O_3$; about 2000 mg/kg of Cu, and about 4500 mg/kg of Zn; and wherein the kaolinite particles have
    (i) a specific area of about 250 $m^2$/g;
    (ii) a cation exchange capacity about 170 meq/100 g;
    (iii) a grain size less than about 180 microns for at least about 95% of the particles;
    (iv) a density in water of about 2.2 kg/$m^3$;
    (v) a pH about 8.87;
    (vi) a positive redox potential; and
wherein the zeolite particles further comprise about 46.5% of $SiO_2$, about 15% of $Al_2O_3$, and about 10% of CaO.

15. The biological activator according to claim 14, wherein the kaolinite particles further comprise about 7.8% to 15% of volatile materials, between about 56.6% and 60.5% of $SiO_2$, between about 23% and 24.6% of $Al_2O_3$, and about 5.5% of $TiO_2$.

16. The biological activator according to claim 15, wherein the zeolite particles further comprise about 15% of volatile materials, about 2.3% of MgO, and about 3% of $Fe_2O_3$.

17. The activator according to claim 14 wherein the activator has:
   (i) a specific area of about 59.3 $m^2/g$;
   (ii) a cation exchange capacity of about 33.5 meq/100 g;
   (iii) a grain size of less than about 4 microns for at least about 61% of the particles and a grain size of less than about 16 microns for at least about 80% of the particles;
   (iv) a density in water of about 2.6 $kg/m^3$;
   (v) a pH of about 7.85;
   (vi) a negative redox potential of less than 350 mV; and
   wherein the activator is comprised of about 8.7% of volatile materials, about 57% of $SiO_2$, about 22.7% of $Al_2O_3$, about 2.1% of $Fe_2O_3$, about 1.5% of CaO, about 0.4% of MgO, about 0.22% of $Na_2O$, about 4.9% of $TiO_2$, about 0.8% of $K_2O_5$, about 0.1% of $P_2O_5$, about 2000 mg/kg of Cu and about 4500 mg/kg of Zn.

18. The biological activator according to claim 17 which further comprises manganese, cobalt and beryllium.

19. The biological activator according to claim 2, wherein the zeolite is natural zeolite.

20. The biological activator according to claim 2, which comprises a mixture of chabazite and phillipsite as the zeolite.

21. The biological activator according to claim 2, wherein the mixture comprises as the zeolite, equal amounts of chabazite and phillipsite as the zeolite.

* * * * *